United States Patent
Copeland

[15] 3,669,430
[45] June 13, 1972

[54] TWO-STAGE LIME MUD CALCINER

[72] Inventor: George G. Copeland, Western Springs, Ill.
[73] Assignee: Copeland System Inc., Oak Brook, Ill.
[22] Filed: Aug. 13, 1970
[21] Appl. No.: 63,544

[52] U.S. Cl.............................................263/21 A, 263/53 R
[51] Int. Cl.........................................................F27b 15/00
[58] Field of Search......................................263/53 R, 21 A

[56] References Cited

UNITED STATES PATENTS

| | | | |
|---|---|---|---|
| 2,650,084 | 8/1953 | White | 263/53 |
| 3,515,381 | 6/1970 | Foch | 263/21 A |
| 3,127,455 | 3/1964 | Culbertson, Jr. et al. | 263/53 |
| 2,789,034 | 4/1957 | Swaine et al. | 263/21 A |

Primary Examiner—John J. Camby
Attorney—Merriam, Marshall, Shapiro & Klose

[57] ABSTRACT

A two-stage system for calcining lime mud. In the first stage the lime mud is mixed with kraft black liquor and dried in a fluidized bed or spray dryer, using as a source of heat for drying, the hot exit gases from the second stage. In the second stage, the dried mixture of mud and black liquor solids is calcined in a fluidized bed operation carried on at temperatures between 1400° and 1900° F. The dried black liquor solids are used as fuel for the calcining operation. The hot exhaust gases from the second stage calcining operation are recycled to the first stage and are used to dry the kraft black liquor in the first stage drying system. Calcined product is continuously removed from the second stage calcining operation and conveyed back to the recausticizing system for reuse in the process.

6 Claims, 1 Drawing Figure

PATENTED JUN 13 1972 3,669,430
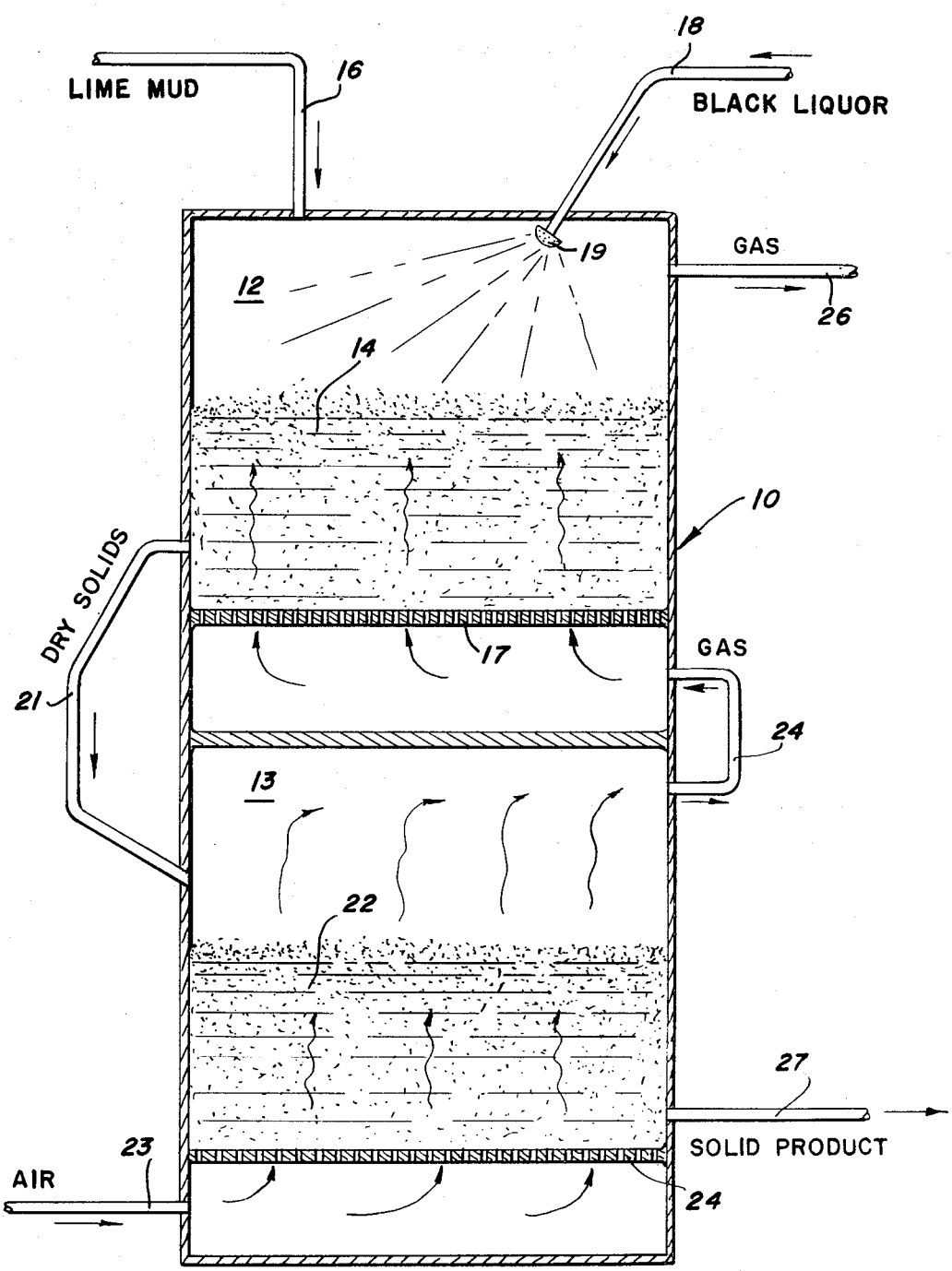
INVENTOR
George G. Copeland
BY Merriam, Marshall, Shapiro & Klose
ATTORNEYS

TWO-STAGE LIME MUD CALCINER

This invention relates to an improved lime mud calcining system which is particularly adaptable to recausticizing systems in kraft pulp mills. More particularly the invention relates to a two-stage system for calcining lime mud which employs no extraneous fuel and which therefore permits substantial economies to be effected in the operation of the system.

In the conventional operation of a sulfate (kraft) liquor recovery system, green liquor is obtained by dissolving in water the smelt produced in the black liquor recovery system. The green liquor, which contains substantial quantities of dissolved sodium carbonate, is clarified to remove any insoluble residue, then treated with lime (causticized) to produce a precipitate (lime mud) consisting primarily of calcium carbonate, while regenerating sodium hydroxide. The precipitated lime mud is separated from the solution (white liquor) containing the regenerated hydroxide, which is recycled for reuse.

The lime mud, after washing to remove entrained white liquor, is dried and calcined for regeneration of lime to be reused in the process. The calcining operation is typically carried out in a rotary cylindrical steel kiln which is lined with refractory material. In order to cause the dissociation of calcium carbonate ($CaCO_3$) into lime (CaO), the temperature in the calciner must reach at least about 1600° F. It is conventional to supply a stream of hot gas at temperatures up to about 2400° F. to one end of the calciner, while the lime mud enters the other end, and moves countercurrently to the hot gas stream. Effective heat exchange between the countercurrent streams of gases and solids within the calciner is relatively difficult to achieve in this operation. Accordingly, the exit gases and reconstituted lime typically leave the calcining operation at elevated temperatures and contain substantial quantities of sensible heat which is either lost or incompletely recovered. In addition, the energy necessary to heat the entering stream of hot gas to the high temperature required for effective calcination is an important factor in the overall cost of the operation.

In accordance with the present invention, there is provided a two-stage system for calcining lime mud. In the first stage the lime mud is mixed with kraft black liquor and dried in a fluidized bed or spray dryer, using as a source of heat for drying, the hot exit gases from the second stage. In the second stage, the dried mixture of mud and black liquor solids is calcined in a fluidized bed operation carried on at temperatures between 1400° F and 1900° F. The dried black liquor solids are used as fuel for the calcining operation. The hot exhaust gases from the second stage calcining operation are recycled to the first stage and are used to dry the kraft black liquor in the first stage drying system. Calcined product is continuously removed from the second stage calcining operation and conveyed back to the recausticizing system for reuse in the process.

The use of combustible black liquor solids as fuel for the calcining operation eliminates the need for any extraneous fuel, thus reducing the cost of the operation. In addition, a possible overloaded condition of the black liquor recovery is relieved by the diversion of some of the black liquor to the calcining operation.

The invention will be better understood from the following detailed description thereof taken in conjunction with the accompanying drawing, which is a diagrammatic representation of a typical embodiment of the invention.

The following description will be that of the operation of a typical system of the invention in which the stated quantities of reactants are those required to produce one ton of regenerated lime. Referring to the drawing, the system consists of an enclosed tower 10 divided by separator 11 into upper and lower zones, 12 and 13 respectively. During steady state operation of the system upper zone 12 contains a fluidized bed 14 of particles of lime mud which are introduced (6037 lb., 65 percent solids, 75° F.) into the system through conduit 16. The bed 14 is maintained in a fluidized condition by means of a flow of gas (9081 lb.) rising upwardly from the bottom of zone 12 through distributor plate 17 and thence upwardly through the bed 14. The gas which is supplied to the bottom of zone 12 is at an elevated temperature 1200° F to 1800° F and in addition to maintaining fluidizing conditions in zone 12 dries the particles of lime mud of any moisture contained therein.

Also introduced to zone 12 through line 18 is black liquor (2,012 lbs., 60 percent solids of which 55 percent are inorganic, 185° F.) which is sprayed through nozzle 19 onto the particles in bed 14. The solids present in the black liquor have a heat value of about 6600 BTU/lb. The drying action of the gas in the fluidized bed deposits the solid materials in the black liquor onto the particles of lime mud and the rapid mixing action of the fluidized bed insures a relatively homogeneous dispersion of the black liquor solids.

A stream of dry lime mud particles (5131 lb., 250° F.) containing the black liquor solids deposited thereon is conveyed via conduit 21 to the lower zone 13 of vessel 10. Not shown in the drawing is conventional solids conveying apparatus which may be necessary for this transfer and which will be apparent to those skilled in the art. In this connection the vertical positioning of zone 12 above zone 13 in a single vessel is advantageous in permitting gravity to aid the transfer of the solid particles from zone 12 to zone 13. It will be apparent that the process could alternatively be carried out with these two zones in separate vessels at the same elevation. In such case, however, additional solids conveying apparatus will probably be required.

The particles of dried lime mud and black liquor solids entering zone 13 are maintained in a fluidized bed 22 by means of an upwardly moving stream of air which enters the bottom of the vessel through conduit 23 and passes through the distributor plate 24. As is the case in zone 12, the stream of air has a velocity which is correlated with the size of the particles in bed 22 to maintain a fluidized condition therein. For the production of one ton of regenerated product, about 7085 pounds of air is introduced through conduit 23, at a temperature of 200° F. The combustion of the black liquor solids within zone 22 in conjunction with this amount of air creates a temperature of about 1400° F to 1900° F within the zone, which causes the regeneration of calcium oxide (lime) from the calcium carbonate which is fed thereto.

The gases leaving bed 22 (9,081 lb., 1600° F.) are conveyed by conduit 24 to the bottom of zone 12 where they are used to fluidize and dry the entering lime mud particles and black liquor in the manner previously described. The exit gases leaving zone 12 via conduit 26 (10,999 lb., 250° F.) are conveyed to a scrubbing system, not shown, and thence to the atmosphere.

The desired regenerated lime product is recovered from zone 13 via conduit 27 in a total quantity of about 3,017 lb., of which one ton is lime, the remainder being inorganic and inert materials introduced in the black liquor.

The system described above can be varied without departing from the scope of the invention. As previously explained, the elevated position of the drying zone relative to the calciner is desirable but not necessary. Similarly, although a fluid bed dryer is desirable, another type of direct contact heat exchanger, such as a spray type dryer, could also be used.

The foregoing detailed description has been given for clearness of understanding only, and no unnecessary limitations should be understood therefrom, as modifications will be obvious to those skilled in the art.

I claim:

1. A process for calcining lime mud from kraft pulping operations to regenerate lime therefrom which comprises mixing said lime mud with black liquor containing combustible solids, drying said mixture by direct heat exchange with a stream of hot gases recycled from a subsequent step in the process to produce dried lime mud particles carrying combustible black liquor solids, creating a fluidized bed of said lime mud particles at elevated temperatures by means of a fluidizing stream of air which also causes combustion of said black liquor solids within said fluidized bed, the quantity of fluidizing air being correlated with the quantity of black liquor solids to produce calcining temperatures in said bed sufficient to regenerate lime from said lime mud, and withdrawing from said calcining step a solid product containing regenerated lime and a stream of hot gases which is recycled to said drying step.

2. The process of claim 1 wherein said mixture of lime mud and black liquor is dried in a bed maintained in a fluidized state by said recycled stream of hot gases.

3. The process of claim 1 wherein said calcining temperature is at least about 1400° F 4. The process of claim 1 wherein said drying step is carried at a physical elevation higher than said calcining step, whereby the transportation of said dried particles from said drying step to said calcining step is effected at least partially by the influence of gravity.

5. Apparatus for calcining lime mud from kraft pulping operations comprising a vessel having an upper drying zone and a lower calcining zone, said upper drying zone comprising means for spraying black liquor containing combustible solids onto a bed of lime mud particles, means for drying said lime mud particles by direct contact with a heated gas produced in said lower calcining zone to produce dry particles of lime mud carrying combustible black liquor solids, means for transporting said dry particles to said lower calcining zone, said lower calcining zone comprising fluid-bed calcining means for creating and maintaining a fluidized bed of said lime mud particles, means for introducing a stream of fluidizing air to said fluidized bed, said air also serving as combustion air for calcining said particles, means for collecting heated gas produced in said calcining zone and conveying said gas to said upper drying zone, and means for collecting and recovering regenerated lime from said calcining zone.

6. Apparatus in accordance with claim 5 wherein said upper drying zone comprises a fluid-bed drier.

* * * * *